United States Patent

[11] 3,522,771

| [72] | Inventor: | Charles E. Jacoby |
| | | Bethlehem, Pennsylvania |
| [21] | Application No.: | 733,409 |
| [22] | Filed: | May 31, 1968 |
| [45] | Patented: | Aug. 4, 1970 |
| [73] | Assignee: | S I Handling Systems, Inc. |
| | | Easton, Pennsylvania |
| | | a corp of Pennsylvania |

[54] TOW TRUCK SELECTOR PIN
5 Claims, Drawing Fig.

[52] U.S. Cl. ................................................. 104/88,
104/172
[51] Int. Cl. ..................................................... B61l 11/02,
B65g 17/12
[50] Field of Search ........................................ 104/88,
139, 140, 141, 142, 143, 144, 145, 146, 156, 172,
178, 244, 244.1; 191/48

[56] References Cited
UNITED STATES PATENTS

| 3,262,397 | 7/1966 | Brandt ..................... | 104/88 |
| 3,373,698 | 3/1968 | Bishop ..................... | 104/88 |

*Primary Examiner*— Arthur L. La Point
*Assistant Examiner*— Robert Saifer
*Attorney*—Seidel and Gonda ABSTRACT: The selector pin for a tow truck is disclosed as being made from flat resilient metal or other metal heat-treated so as to have the properties thereof. The flat selector pin is provided with a 180° twist. The flexibility and high yield strength of the selector pin overcomes problems in the industry wherein selector pins made from round cold rolled low carbon steel are subjected to bending.

Patented Aug. 4, 1970
3,522,771
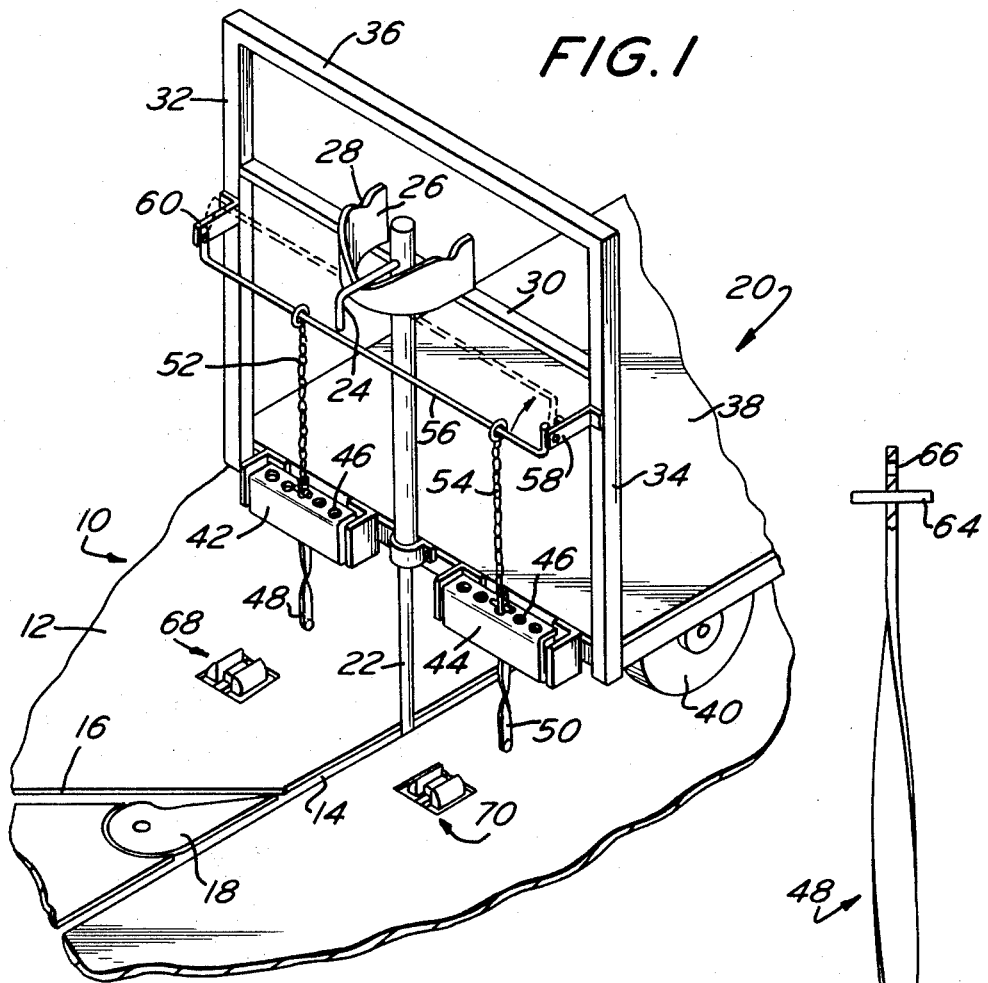
FIG. 1
FIG. 3
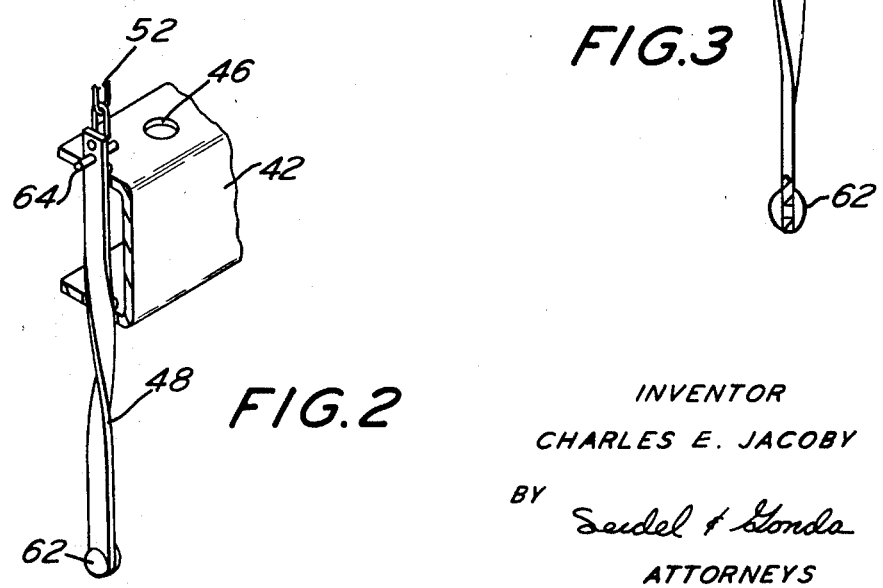
FIG. 2
INVENTOR
CHARLES E. JACOBY
BY Seidel & Gonda
ATTORNEYS

U.S. PATENT 3,522,771
TOW TRUCK SELECTOR PIN

This invention relates to selector pins of a type adapted for use on tow trucks. Typical examples of tow trucks having selector pins are shown, for example, in U. S. patents 3,103,183; 3,103,895; and 3,262,397. A selector pin is also frequently called a trip rod. Heretofore, the selector pins have generally been made from round cold rolled low carbon steel. In some large installations, as many as 200 selector pins are bent during any 24 hour period of operation.

The phenomenon of having selector pins bent during operation is one which the industry has lived with. The selector pins are bent during operation through a wide variety of circumstances. Most installations are put in locations wherein the system is incorporated in a concrete floor. Acceptable tolerances in the building industry for concrete floors is a tolerance of 1/4 inch. The selector pins have their lowermost ends spaced from the floor by 1/4 to 3/4 of an inch. Hence, any unevenness in the floor will bend the selector pin. Due to skew of the vehicle, selector pins are caused to make contact with a guard rail or bump on the floor which likewise bends the selector pin.

In accordance with the present invention, the selector pin is made from flat bar stock and provided with at least a 180° twist. A selector pin of this construction will have an end face of the bar stock facing in all directions. A suitable spring steel which may be utilized is AISI 1095 heat-treated to a Rockwell C45-48. A pin of this material will have a yield strength of approximately 280,000 psi as compared with the yield strength of 70,000 psi for the cold rolled low carbon steel selector pins utilized heretofore. A selector pin of this construction can be flexed without permanent deformation and thereby has a substantially lesser tendency to becoming bent under operating conditions.

It is an object of the present invention to provide a novel tow truck selector pin.

It is another object of the present invention to provide a novel selector pin which may be utilized in tow truck systems without any substantial permanent deformation.

It is another object of the present invention to provide a novel tow truck selector pin which reduces or eliminates the substantial casualties occasioned by bent selector pins during operation of tow truck systems.

It is another object of the present invention to provide a tow truck selector pin which is simple, easy to construct, and which is made from spring steel.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial perspective view of a tow truck system wherein the tow truck incorporates the novel selector pin of the present invention.

FIGURE 2 is a partial perspective view of the selector pin and its support member illustrated in FIGURE 1.

FIGURE 3 is a front elevation view of the selector pin of the present invention.

Referring to the drawing in detail, wherein like numerals indicate like elements, there is shown in FIGURE 1 a tow truck system designated generally as 10. The system 10 includes a floor 12 having a main slot 14 and intersected at spaced points therealong by a shunt slot such as shunt slot 16. Movement from main slot 14 to movement along shunt slot 16 is controlled by a selectively operable diverter 18.

A vehicle or tow truck 20 is mounted for movement along the main slot 14. When the selector pins are in the proper location, the truck 20 may be diverted from movement along the main slot 14 to movement along the shunt slot 16. Truck 20 is guided for movement along the main slot 14 by means of a tow pin 22.

The tow pin 22 extends downwardly through the slot 14. The upper end of the tow pin 22 is provided with a handle 24. Handle 24 is supported by a cam 26. Cam 26 has a central notch which supports the handle 24 when the tow pin has its lowermost end extending through the slot 14. Cam 26 has at least one upper notch 28. When the handle 24 is supported by notch 28, the tow pin will have its lowermost end above the floor level.

Cam 26 is supported by bridgework at the front end of the truck 20. Such bridgework includes a cross-bar 30 supported at its ends by uprights 32 and 34. A rail 36 extends across the upper end of the uprights. Vehicle 20 includes a platform 38 supported on wheels 40.

At the front end of the truck 20, there is provided first and second selector pin support members 42 and 44. These members are on opposite sides of the tow pin 22. Each of the members are identical. Hence, only member 42 will be described in detail.

Support member 42 may be channel-shaped in cross section as shown more clearly in FIGURE 2. Aligned holes 46 are provided in each of the horizontal legs of member 42 at spaced points therealong. A selector pin 48 extends through one pair of aligned holes on member 42. A comparable selector pin 50 extends through a comparable pair of holes 46 on member 44.

The selector pin 48 is provided at its upper end with some means for attaching the same to a chain 52. The upper end of pin 50 is attached to a chain 54. The chains 52 and 54 are each attached to a ring which is slidable along a bar 56. Bar 56 has its ends pivotably supported by brackets 58 and 60. Hence, when it is desired to simultaneously raise the selector pins 48 and 50 so that the same may be raised from the operative position shown to an inoperative position, the bar 56 is rotated to the phantom position shown in FIGURE 1.

The selector pins 48 and 50 are preferably made from a spring steel such as AISI 1095 and heat-treated to a Rockwell C45-48. As a result thereof, the selector pins will have a yield strength of approximately 280,000 psi and will be able to deflect without permanent deformation when hitting an obstruction while at the same time having sufficient toughness so as to actuate a mechanism for operating a diverter which requires a force equivalent to a 40-pound pull. Good results have been obtained by using flat bar stock having a thickness of .156 inches and a width of .56 inches. Before being tempered, the bar stock is twisted so as to have at least a 180° twist. Such twisting of the bar stock will always produce an end face in all directions.

A means is provided to increase the cross section of the lowermost end of the selector pins. In this regard, the selector pins have a hole drilled therethrough and a rivet 62 attached. The bulbous end provided by the rivet assures that the selector pin will have sufficient cross section in all directions so as to actuate the operating mechanism for the diverter 18. A hole 66 is drilled at the upper end of the selector pin so as to facilitate connecting the same to the end of the support chains. Also, a pin 64 is attached adjacent the upper end of the selector pin so as to prevent the same from falling through the holes 46. The length of the pin 64 exceeds the diameter of the holes 46.

Actuator units 68 and 70 may be provided to actuate the diverter 18 in response to simultaneous contact with the selector pins 48 and 50. The units 68 and 70 and the manner in which they actuate the diverter 18 may be as set forth in U. S. patent 3,261,300.

It will be apparent to those skilled in the art that the selector pins may be modified in a manner which is the equivalent of that shown. For example, instead of pin 64, a washer may be attached to the selector pins to perform the function of pin 64. Also, other means are available for increasing the cross section of the lowermost end of the selector pins in place of the rivet 62. When using a rivet, I prefer to use a 4140 steel rivet because of the hardness of the same. The cross section at the lowermost end of the selector pins may be increased by welding an attachment thereto or by deforming the lowermost end so that it is bent back on itself.

The present invention may be embodied in other specific forms without departing from the spirit or essential attributes thereof.

I claim:

1. A tow truck selector pin comprising a flat resilient strip of metal twisted at least 180°, means at one end of the strip to facilitate supporting the same from a tow truck, and the other end of the strip being enlarged so as to have a larger cross section as compared with the cross section along a major length of the strip.

2. A selector pin in accordance with Claim 1 wherein the lowermost end of the strip is enlarged by a rivet having its shank extending through the strip.

3. A selector pin in accordance with Claim 1 wherein said strip is made from AISI 1095 spring steel and has a hardness of approximately Rockwell C45-48.

4. A selector pin in accordance with Claim 1 wherein said strip has a yield strength of at least 200,000 psi so that it can deflect without permanent deformation when hitting an obstruction and has sufficient rigidity so that it may actuate a diverter unit requiring a force of 40 pounds.

5. A selector pin in accordance with Claim 1 wherein said means includes a pin extending from the opposite major faces of the flat strip.